(12) United States Patent
Mori (10) Patent No.: US 7,181,912 B2
(45) Date of Patent: Feb. 27, 2007

(54) POWER DEVICE EQUIPPED WITH COMBUSTION ENGINE AND STIRLING ENGINE

(75) Inventor: Masayoshi Mori, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/542,321

(22) PCT Filed: Apr. 23, 2004

(86) PCT No.: PCT/JP2004/005861

§ 371 (c)(1),
(2), (4) Date: Jul. 13, 2005

(87) PCT Pub. No.: WO2004/099599

PCT Pub. Date: Nov. 18, 2004

(65) Prior Publication Data
US 2006/0053785 A1    Mar. 16, 2006

(30) Foreign Application Priority Data
May 9, 2003  (JP) .............................. 2003-131787

(51) Int. Cl.
*F02G 3/00* (2006.01)
(52) U.S. Cl. .............................. 60/616; 60/517; 60/698
(58) Field of Classification Search ............... 60/614, 60/616, 618, 517, 698
See application file for complete search history.

(56) References Cited

U.S. PATENT DOCUMENTS

| 4,901,531 A * | 2/1990 | Kubo et al. ................ 60/618 |
| 5,346,031 A * | 9/1994 | Gardner ....................... 180/179 |
| 6,405,701 B1 * | 6/2002 | Masberg et al. .......... 123/192.1 |
| 6,543,229 B2 * | 4/2003 | Johansson ................... 60/605.1 |

FOREIGN PATENT DOCUMENTS

| JP | 64-75865 | 3/1989 |
| JP | 2000-310158 | 11/2000 |
| JP | 2001-298803 | 10/2001 |
| JP | 2002-266701 | 9/2002 |
| JP | 2003-518458 | 6/2003 |
| WO | WO 00/29249 A2 | 5/2000 |

* cited by examiner

*Primary Examiner*—Hoang Nguyen
(74) *Attorney, Agent, or Firm*—Arent Fox PLLC (57) ABSTRACT

A power unit for a vehicle, such as an automobile, includes an internal combustion engine 1 as a prime mover for the vehicle, a generator 3, and a Stirling engine 4 for driving the generator 3. The Stirling engine 4 uses the exhaust gas discharged by the internal combustion engine 1 as a high-temperature heat source. Power generated by the generator 3 is supplied to an electric motor 2 for driving auxiliary machines 7, 8 and 9, and to a battery 5 for supplying power to the electric motor 2. The engine speed of the Stirling engine 4 is controlled through the control of the load on the generator 3 by a field regulator 15. An optimum engine speed of the Stirling engine 4 is determined such that the brake horsepower of the Stirling engine 4 increases to a maximum or substantially maximum brake horsepower. The fuel consumption of the internal combustion engine 1 as the prime mover that produces waste heat as a high-temperature heat source for the Stirling engine 4 is reduced, and the auxiliary machines are driven so as to fully exercise their functions even in a state where the brake horsepower of the Stirling engine 4 is low.

9 Claims, 4 Drawing Sheets

POWER DEVICE EQUIPPED WITH COMBUSTION ENGINE AND STIRLING ENGINE

CROSS-REFERENCE TO RELATED APPLICATION

This application is a National Stage entry of International Application Number PCT/JP2004/005861, filed Apr. 23, 2004. The disclosure of the prior application is hereby incorporated herein in its entirety by reference.

TECHNICAL FIELD

The present invention relates to a power unit including a combustion engine as a power source, a Stirling engine using waste heat from the combustion engine as a heat source, and auxiliary machines. More specifically, the present invention relates to a power unit including a combustion engine, a Stirling engine and auxiliary machines, and capable of using power generated by a generator driven by the Stirling engine for driving the auxiliary machines.

BACKGROUND ART

Stirling engines for driving a generator are disclosed in JP 64-75865 A and JP 2002-266701 A. The Stirling engine disclosed in JP 64-75865 A drives a refrigerant compressor included in a heat pump, and a generator. When the engine speed of the Stirling engine changes due to changes in air-conditioning load and the atmospheric condition, a field regulator included in the generator regulates the magnetic field of the generator to control the engine speed of the Stirling engine. Consequently, a change in load on the heat pump is compensated by electric load to maintain the load on the Stirling engine constant.

The Stirling engine disclosed in JP 2002-266701 A uses heat of reaction generated by a catalytic converter placed in the exhaust system of an internal combustion engine, namely, an automotive power unit, for exhaust emission control as a heat source. Mechanical energy generated by the Stirling engine is used for driving a generator and automotive auxiliary machines.

Although the Stirling engine mentioned in JP 64-75865 A uses the heat of a combustion gas produced by a combustor included in the Stirling engine for heating the working gas, nothing is taken into consideration about the use of the brake horsepower of the Stirling engine for reducing the fuel consumption of the combustor. The Stirling engine mentioned in JP 2002-266701 A uses the catalytic converter as a heater. The catalytic converter is heated by the heat of the exhaust gas from the internal combustion engine and the heat of reaction. Since the brake horsepower of the Stirling engine drives the automotive auxiliary machines, and the internal combustion engine does not, the internal combustion engine operates at a low fuel consumption rate and fuel consumption rate for running can be improved. However, in a state where the temperature of the exhaust gas is low, the catalytic converter is not heated at temperatures for its active state, and the brake horsepower of the Stirling engine is low, the auxiliary machines, in some cases, cannot be driven for its normal operation and cannot achieve its functions sufficiently.

Control of the engine speed of the Stirling engine mentioned in JP 64-75865 A through the regulation of load on the generator keeps the load on the Stirling engine driving the refrigerant compressor constant such that the Stirling engine operates at a maximum thermal efficiency. However, an engine speed at which the thermal efficiency of the Stirling engine is a maximum does not coincide with an engine speed at which the brake horsepower of the Stirling engine is a maximum. Usually, the engine speed at which the thermal efficiency is a maximum is lower than that at which the brake horsepower is a maximum. Consequently, the power generating ability of the generator cannot be held at a high level and the generator cannot generate sufficient power.

The present invention has been made in view of such circumstances and it is a principal object of the present invention to reduce the fuel consumption of an internal combustion engine serving as a prime mover that discharges waste heat as a high-temperature heat source for a Stirling engine, and to ensure that auxiliary machines are driven so that its functions can be fully exercised even if the brake horsepower of the Stirling engine is low. Another object of the present invention is to recover the thermal energy of waste heat as much as possible, to further reduce the fuel consumption of a combustion engine, and to ensure that auxiliary machines can be satisfactorily driven even if power supplied from a generator and a battery is not sufficient for properly driving the auxiliary machines.

DISCLOSURE OF THE INVENTION

According to the present invention, a power unit includes: a combustion engine as a prime mover for driving devices; auxiliary machinery for the combustion engine; an electric motor; a generator; and a Stirling engine operated by a working gas to drive the generator; wherein the Stirling engine has a heater that uses waste heat produced by the combustion engine for heating the working gas, the battery is connected to the electric motor to supply power to the electric motor, the generator is connected to the electric motor and the battery to supply generated power to the electric motor and the battery, and the electric motor is connected to the auxiliary machinery to drive the auxiliary machinery.

When the waste heat generated by the combustion engine has sufficient thermal energy, and the generator driven by the Stirling engine is able to generate power sufficient for driving the auxiliary machinery, the auxiliary machinery is driven by the electric motor, the combustion engine does not need to drive the auxiliary machinery, and hence the fuel consumption of the combustion engine as a prime mover for driving auxiliary machinery decreases accordingly. When the waste heat generated by the combustion engine has insufficient thermal energy, the brake horsepower of the Stirling engine is low, and the generator is unable to generate power sufficient for driving the auxiliary machinery, the auxiliary machinery can be driven in a mode capable of sufficiently exercising its functions by power supplied from the battery charged by power generated by the generator.

According to the present invention, the power unit may further include an engine speed control means for adjusting the engine speed of the Stirling engine to an optimum engine speed at which the Stirling engine produces a maximum or substantially maximum brake horsepower.

Thus, the engine speed of the Stirling engine adjusted to the optimum engine speed at which the Stirling engine produces the maximum brake horsepower even if the output characteristic of the Stirling engine varies according to the variation of the thermal energy of the waste heat. Consequently, the generator is driven by the maximum or substantially maximum brake horsepower to generate maximum or substantially maximum power.

The present invention has the following effects. The generator driven by the maximum or substantially maximum brake horsepower generates the maximum or substantially maximum power. Thus, the largest possible part of the thermal energy of the waste heat can be recovered, the frequency of driving the auxiliary machinery by the electric motor driven by sufficient power increases and thereby the fuel consumption of the combustion engine can be further reduced.

Preferably, the auxiliary machinery is an auxiliary machine group including a plurality of auxiliary machines, the auxiliary machines of the auxiliary machine group are connected through a transmission mechanism including clutches to the combustion engine, the clutches are engaged and disengaged to drive the plurality of auxiliary machines selectively by the combustion engine or the electric motor, and a control system determines selectively the number of the auxiliary machines to be driven by the electric motor.

Thus, when the power generated by the generator is insufficient for driving all the predetermined number of auxiliary machines by the electric motor, the number of the auxiliary machines to be driven by the electric motor is changed according to the power generated by the generator and thereby the fuel consumption of the combustion engine is reduced accordingly. The combustion engine drives the auxiliary machines when the generator is unable to generate sufficient power due to the insufficient thermal energy of the waste heat and the resultant low brake horsepower of the Stirling engine.

Consequently, the following effects are obtained. Since the electric motor drives as many ones as possible of the plurality of auxiliary machines according to the power generated by the generator, the fuel consumption of the combustion engine can be reduced. Even if the generator and the battery are unable to supply sufficient power, the auxiliary machines can be surely driven by the combustion engine.

According to an embodiment of the present invention, the combustion engine is interlocked with a first one of the auxiliary machines by a first clutch, the auxiliary machine interlocked with the combustion engine is interlocked with the electric motor by a second clutch, the electric motor is operatively connected to the rest of the auxiliary machines, and the first and the second clutch are controlled by a control system so as to be engaged or disengaged according to the operating condition of the power unit. Thus, the auxiliary machines can be surely driven selectively by the combustion engine or the electric motor.

More concretely, the control system operates to engage both the first and the second clutch to connect the combustion engine operatively to all the auxiliary machines when the combustion engine is operating in a low-load operation range and sufficient power cannot be supplied to the electric motor.

According to the present invention, the control system operates to disengage the second clutch and connect the auxiliary machines excluding the first auxiliary machine to the electric motor when the power for driving only the auxiliary machines excluding the first auxiliary machine is supplied to the electric motor while the combustion engine is operating in a middle-load operation range. Thus, the auxiliary machines excluding the first auxiliary machine are driven by the electric motor.

According to the present invention, the control system operates to disengage the first and the second clutch and to connect all the auxiliary machines to the electric motor when power sufficient for driving all the auxiliary machines is supplied to the electric motor while the combustion engine is operating in a high-load operation range. Thus, all the auxiliary machines are driven by the electric motor.

BEST MODE FOR CARRYING OUT THE INVENTION

A preferred embodiment of the present invention will be described with reference to FIGS. 1 to 4.

Figure 1:
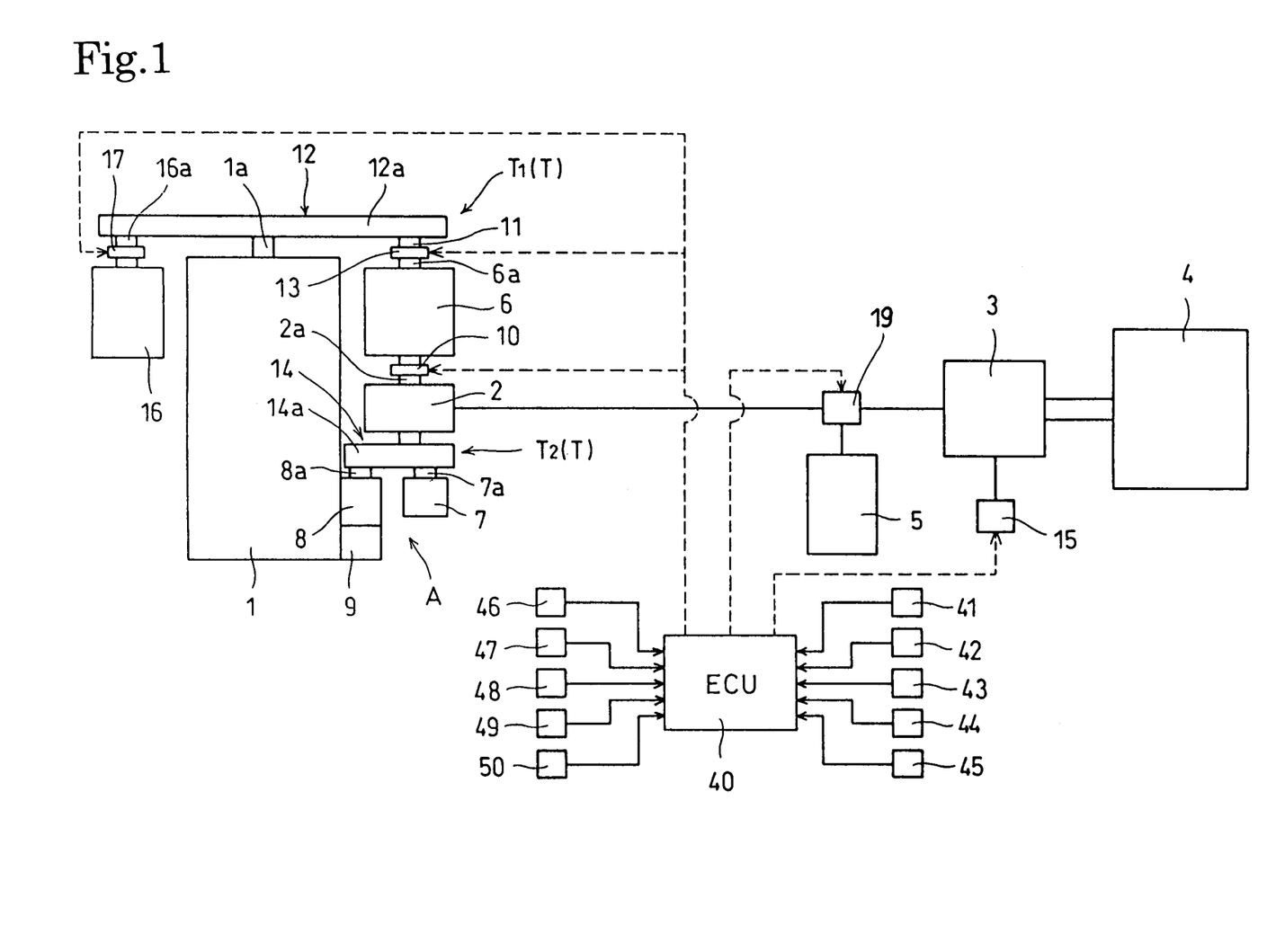
FIG. 1 is a schematic view that explains a power unit in a preferred embodiment of the present invention including an internal combustion engine and a Stirling engine.

Referring to FIG. 1, a power unit in a preferred embodiment of the present invention includes a water-cooled multicylinder internal combustion engine 1, a predetermined number of auxiliary machines, an electric motor 2, a generator 3, a Stirling engine 4 for driving the generator 3, a battery 5, and a control system including a control unit (hereinafter, referred to as "ECU") 40. The power unit is mounted on a vehicle, and the internal combustion engine 1 serves as a prime mover for driving the vehicle.

The internal combustion engine 1 has pistons fitted in cylinders for reciprocating motion, and a crankshaft 1a driven for rotation by the pistons. The pistons are driven by the pressure of a combustion gas produce by the combustion of an air-fuel mixture produced by fuel ejected into the cylinders by fuel injection valves and air supplied into the cylinders through an air intake system provided with a throttle valve in combustion chambers. The power of the crankshaft 1a is transmitted through a power transmission system including a transmission to the driving wheels of the vehicle to drive the vehicle for running.

The combustion gas discharged from the combustion chambers, i.e., an exhaust gas, flows into an exhaust system provided with a catalytic converter, i.e., an exhaust emission control device. The exhaust gas is made harmless by the catalytic converter, and the harmless exhaust gas is supplied to heaters $27_1$ and $27_2$ (FIG. 2) included in the Stirling engine 4. The harmless exhaust gas is discharged into the atmosphere after transferring heat to the heaters $27_1$ and $27_2$.

The predetermined number of auxiliary machines included in an auxiliary machine group A are four auxiliary machines, namely, a compressor 6 included in an air conditioning system, a power steering pump 7 included in a power steering system, a water pump 8 included in a cooling system for cooling the internal combustion engine 1 to circulate cooling water through the internal combustion engine 1, and an oil pump 9 for pumping oils to lubricated parts of the internal combustion engine 1. The power unit includes an auxiliary generator 16 capable of generating the least necessary power in case of an emergency where the generator 3 is unable to generate power.

The auxiliary machine group A is operatively connected to the crankshaft 1a, i.e., an output shaft, by a transmission mechanism T including clutches 10 and 13. The compressor 6, the three pumps 7, 8 and 9, and the auxiliary generator 16 are rotationally driven by the internal combustion engine 1. The transmission mechanism T includes a first transmission mechanism $T_1$ operatively connecting the respective shafts $6a$ and $16a$ of the compressor 6 and the auxiliary generator 16 to the crankshaft $1a$, and a second transmission mechanism $T_2$ operatively connecting the shaft $7a$ of the power steering pump 7, the shat $8a$ of the water pump 8, and the shaft of the oil pump 9 to the shaft $2a$ of the electric motor 2, and the clutch 10 for the connection and disconnection of the respective shafts $2a$ and $6a$ of the electric motor 2 and the compressor 6. The clutch 10 is an electromagnetic clutch.

The first transmission mechanism $T_1$ includes a transmission mechanism 12 having a transmission belt $12a$ operatively interconnecting the crankshaft $1a$, a driven shaft 11 and the shaft $16a$, and the clutch 13 for the connection and disconnection of the driven shaft 11 and the shaft $6a$. The clutch 13 is an electromagnetic clutch. The second transmission mechanism $T_2$ has a transmission mechanism 14 including a transmission belt $14a$ wound around the shafts $2a$, $7a$ and $8a$ to operatively interconnect the shafts $2a$, $7a$ and $8a$ and the shaft of the oil pump 9. The water pump 8 and the oil pump 9 have the shaft $8a$ in common. The water pump 8 and the oil pump 9 may be individually provided with coaxially coupled shafts, respectively. The shafts $16a$ of the auxiliary generator 16 and is connected through an electromagnetic clutch 17 to the crankshaft $1a$. The ECU 40 disengages the electromagnetic clutch 17 when the auxiliary generator 16 does not need to generate power.

The electric motor 2 is driven by power supplied by the generator 3 and the battery 5 and is capable of rotationally driving the compressor 6 and the pumps 7, 8 and 9. Power is supplied by the battery 5 to the electric motor 2 and the electric motor 2 drives the crankshaft $1a$ rotationally through the compressor 6 and the first transmission mechanism $T_1$ to restart the internal combustion engine 1 in an idle stop state.

The ECU 40 engages or disengages the clutches 10 and 13 according to the operating condition, such as idle stop, of the internal combustion engine 1, the power generating rate of the generator 3 and the state of charge of the battery 5. The compressor 6 and the pumps 7, 8 and 9 are driven selectively by the internal combustion engine 1 and the electric motor 2 and the number of the auxiliary machines to be driven by the electric motor 2 is determined by properly engaging and disengaging the clutches 10 and 13.

More concretely, in a first drive mode, where the clutches 10 and 13 are engaged, all the auxiliary machines of the auxiliary machine group A, i.e., the compressor 6 and the pumps 7, 8 and 9, are driven by the crankshaft $1a$. In the first drive mode, the electric motor 2 does not produce any driving force and idles. In a second drive mode, where the clutch 13 is engaged and the clutch 10 is disengaged, only the compressor 6 of the auxiliary machine group A is driven by the crankshaft $1a$, and the pumps 7, 8 and 9 are driven by the electric motor 2. In a third drive mode, where the clutch 13 is disengaged and the clutch 10 are engaged, all the auxiliary machines of the auxiliary machine group A, i.e., the compressor 6 and the pumps 7, 8 and 9, are driven by the electric motor 2.

The pumps 7, 8 and 9, which are essential auxiliary machines indispensable for the running of the vehicle and the operation of the internal combustion engine 1, are constantly interlocked by the second transmission mechanism $T_2$ and are stopped and operated simultaneously. Only the pumps 7, 8 and 9 among the auxiliary machines of the auxiliary machine group A are driven by the electric motor 2 even in a state where the generator 3 generates power at a comparatively low generating rate.

The compressor 6 is the largest load among the auxiliary machines of the auxiliary machine group A and is operated less frequently than the pumps 7, 8 and 9. Therefore, the compressor 6 is driven by the internal combustion engine 1 independent of the pumps 7, 8 and 9.

Figure 2:
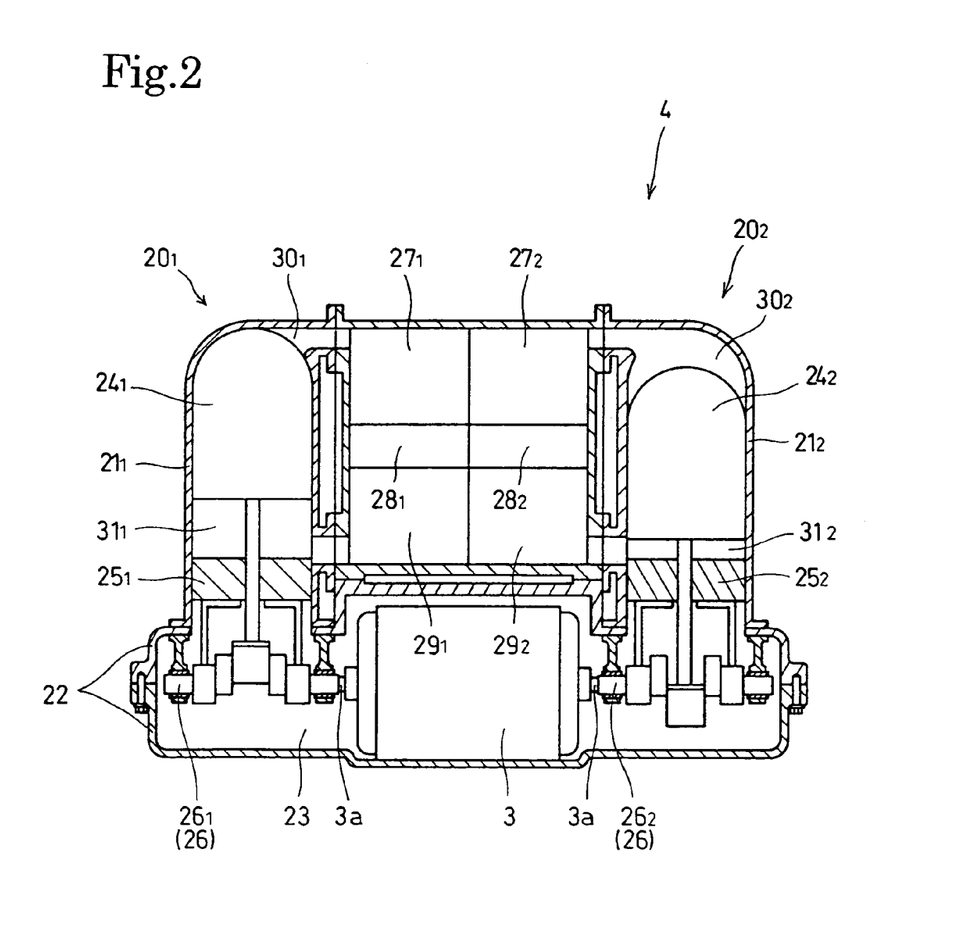
FIG. 2 is a longitudinal sectional view of the Stirling engine shown in FIG. 1.

Referring to FIG. 2, the Stirling engine 4 is of a two-stage type including a first engine unit $20_1$ and a second engine unit $20_2$ in combination. The Stirling engine 4 has a crankshaft 26, two cylinders $21_1$ and $21_2$, a crankcase 22 united with the cylinders $21_1$ and $21_2$ and defining a crankshaft chamber 23 for containing the crankshaft 26, displacer pistons $24_1$ and $24_2$ respectively fitted in the cylinders $21_1$ and $21_2$ for reciprocation, power pistons $25_1$ and $25_2$ respectively fitted in the cylinders $21_1$ and $21_2$ for reciprocation, the crankshaft 26 connected to and driven by the power pistons $25_1$ and $25_2$, the heaters $27_1$ and $27_2$, regenerators $28_1$ and $28_2$ and coolers $29_1$ and $29_2$ respectively belonging to the engine units $20_1$ and $20_2$.

In the engine units $20_1$ and $20_2$, variable-volume high-temperature spaces $30_1$ and $30_2$ are defined by upper parts of the cylinders $21_1$ and $21_2$, and the displacer pistons $24_1$ and $24_2$, and variable-volume low-temperature spaces $31_1$ and $31_2$ are formed between the displacer pistons $24_1$ and $24_2$, and the power pistons $25_1$ and $25_2$, respectively. The high-temperature spaces $30_1$ and $30_2$, and the low-temperature spaces $31_1$ and $31_2$ are constantly connected to the heaters $27_1$ and $27_2$, the regenerators $28_1$ and $28_2$ and the coolers $29_1$ and $29_2$, respectively, by passages. The high-temperature spaces $30_1$ and $30_2$, and the low-temperature spaces $31_1$ and $31_2$, and the passages are filled up with high-pressure helium gas as a working gas.

The displacer pistons $24_1$ and $24_2$ and the power pistons $25_1$ and $25_2$ are connected to the crankshaft 26 in the crankshaft chamber 23 by motion conversion mechanisms for converting a reciprocating motion into a rotational motions and vice versa, respectively. The motion converting mechanisms convert the reciprocating motions of the power pistons $25_1$ and $25_2$ parallel to the axes of the cylinders $21_1$ and $21_2$ into the rotational motion of the crankshaft 26, and coverts the rotational motion of the crankshaft 26 into reciprocating motions of the displacer pistons $24_1$ and $24_2$ parallel to the axes of the cylinders $21_1$ and $21_2$.

Figure 3:
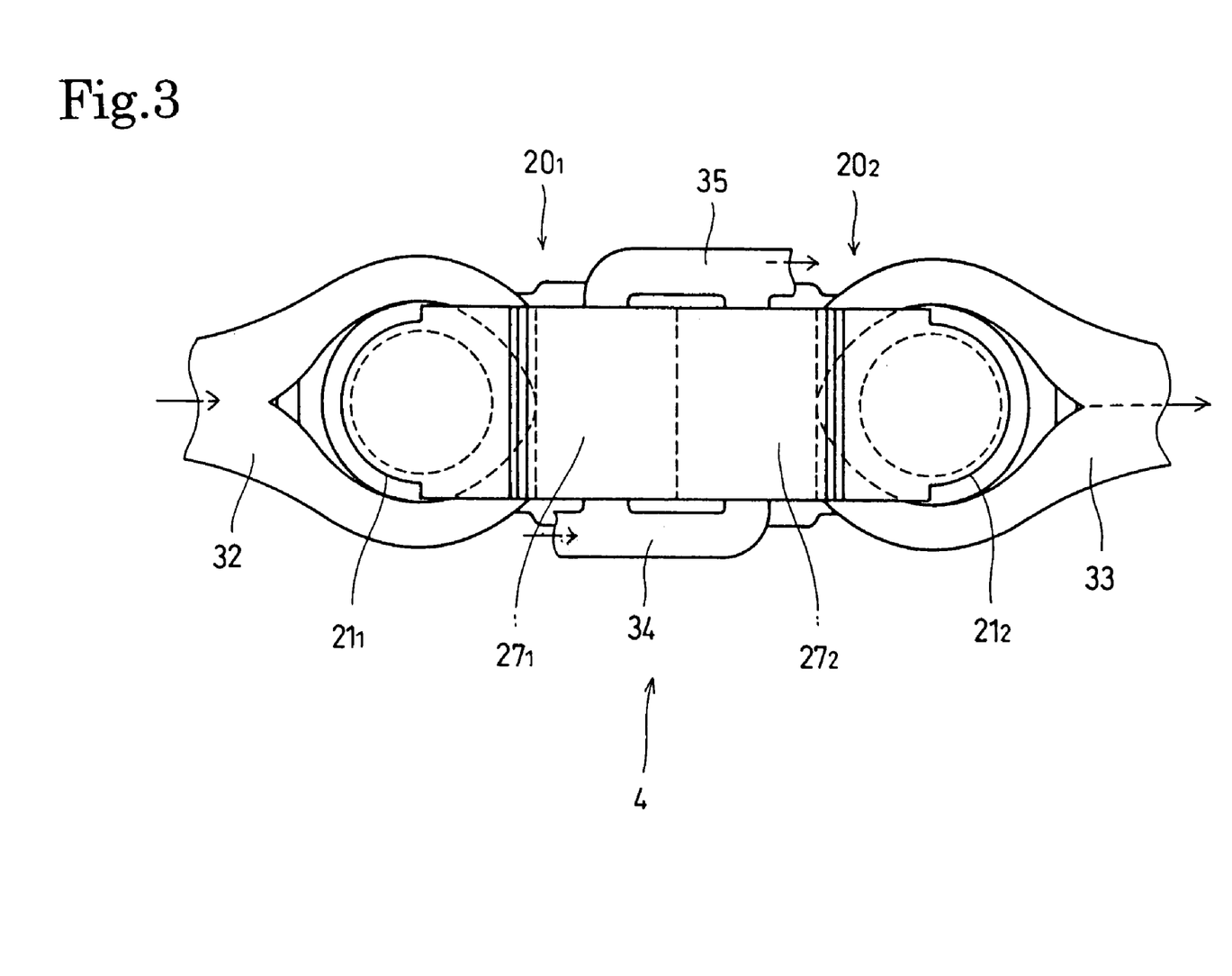
FIG. 3 is a plan view of the Stirling engine shown in FIG. 2.

Referring to FIG. 3 as well, the exhaust gas discharged from the internal combustion engine 1 is supplied through the exhaust system and exhaust gas supply pipe 32 to the heaters $27_1$ and $27_2$ that use the waste heat, i.e., a high-temperature heat source, produced by the internal combustion engine 1 for heating the working gas. In this embodiment, the exhaust gas flows through the exhaust gas supply pipe 32 into the heater $27_1$ of the first engine unit $20_1$, flows from the first heater $27_1$ into the heater $27_2$ of the second engine unit $20_2$, and is discharged through the discharge pipe 33 into the atmosphere. The heaters $27_1$ and $27_2$ respectively connecting the high-temperature space $30_1$ and the regenerators $28_1$, and the high-temperature space $30_2$ and the regenerator $28_2$ heats the working gas by the heat of the exhaust gas, i.e., a heating fluid.

Cooling water cooled to a low temperature while the same is flowing through a radiator included in the cooling system for cooling the internal combustion engine 1 and pumped by the water pump 8, flows through a supply pipe 34 connected to the discharge port of the water pump 8 into the coolers $29_1$ and $29_2$ and then flows through a discharge pipe 35 toward the radiator. The coolers $29_1$ and $29_2$ disposed between the low-temperature space $31_1$ and the regenerator $28_1$ and between the low-temperature space $31_2$ and the regenerator $28_2$, respectively, cools the working gas by the cooling water, i.e., a cooling fluid.

In the first engine unit $20_1$ and the second engine unit $20_2$, the respective phases of the displacer pistons $24_1$ and $24_2$ are advanced by approximately 90° relative to those of the power pistons $25_1$ and $25_2$, respectively. There is a phase difference of 180° between the respective motions of the displacer pistons $24_1$ and $24_2$. Thus, the working gas flows between the high-temperature space $30_1$ and the low-temperature space $31_1$ and between the high-temperature space $30_2$ and the low-temperature space $31_2$ through the heaters $27_1$ and $27_2$, the regenerators $28_1$ and $28_2$ and the coolers $29_1$ and $29_2$ according to the variation of the volumes of the high-temperature spaces $30_1$ and $30_2$ and the low-temperature spaces $31_2$ and $31_2$ due to the reciprocation of the displacer pistons $24_1$ and $24_2$ and the power pistons $25_1$ and $25_2$. When the volume of the high-temperature space $30_1$ ($30_2$) increases, the pressure of the working gas in the high-temperature space $30_1$ ($30_2$) and the low-temperature space $31_1$ ($31_2$) increases, and the power piston $25_1$ ($25_2$) is driven by the pressure of the high-pressure working gas to rotate the crankshaft 26.

Referring to FIG. 2, the generator 3 is contained in the crankshaft chamber 23. The generator 3 is driven by the crankshaft 26, i.e., an output shaft. The crankshaft 26 is divided into a first crankshaft division $26_1$ for the first engine unit $20_1$, and a second crankshaft division $26_2$ for the second engine unit $20_2$. The generator 3 is disposed between the crankshaft divisions $26_1$ and $26_2$. Opposite ends of the shaft 3a of the generator 3 are coupled with the crankshaft divisions $26_1$ and $26_2$ to connect the crankshaft divisions $26_1$ and $26_2$ operatively through the generator 3.

Referring to FIG. 1, power generated by the generator 3 is used for driving the electric motor 2 and for charging the battery 5. The battery 5 is capable of supplying power to all the electric devices of the vehicle including a lighting system including headlamps, tail lamps and stop lamps, audiovisual devices, indicators including a navigation system, and communication system. The ECU 40 controls a controller 19 including a voltage regulator and inverters to supply the power generated by the generator 3, to charge the battery 5 with the power generated by the generator 3, and to supply power from the battery 5 to the electric motor 2 and the electric devices.

A field regulator 15, i.e., a load control means, for controlling load on the generator 3 is connected to the generator 3. The field regulator 15 regulates field current to control load on the generator 3.

The brake horsepower characteristic of the Stirling engine 4 varies according to the operating condition of the internal combustion engine 1. Practically, the thermal energy of the exhaust gas that varies in a wide range as compared with the range in which the temperature of the cooling water varies dominates the brake horsepower of the Stirling engine 4. As regards the brake horsepower in an operating condition of the Stirling engine 4 corresponding to a specific condition of the exhaust gas in thermal energy, the engine speed of the Stirling engine 4 at which a maximum brake horsepower is developed is dependent on the brake horse power characteristic corresponding to the operating condition. In view of recovering the thermal energy of the exhaust gas at the highest efficiency, it is preferable to drive the generator 3 by the maximum brake horsepower for the brake horsepower characteristic to make the generator 3 generates maximum power.

The ECU 40 sets an optimum engine speed for the Stirling engine 4 suitable for developing maximum brake horsepower on the basis of the operating condition of the internal combustion engine 1, more specifically, the condition of the thermal energy of the exhaust gas. The ECU 40 controls the load on the generator 3 through the control of the field regulator 15 to control the engine speed of the Stirling engine 4. Thus, the field regulator 15 serves also as an engine speed control means.

The control operation of the ECU 40 for controlling the output of the Stirling engine 4 and the clutches 10 and 13 will be described with reference to FIGS. 1 and 4.

Referring to FIG. 1, the control system includes, in addition to the ECU 40 provided with a CPU (central processing unit), an engine speed sensor 41 that measures the engine speed N of the Stirling engine 4 on the basis of the rotational speed of the crankshaft 26, a generated energy measuring device 42 for measuring the generated energy generated by the generator 3, a voltage sensor 43 for measuring the voltage of the battery 5, a temperature sensor 44 for measuring the temperature of the exhaust gas at the inlet of the heater $27_1$ (FIG. 3), a temperature sensor 45 for measuring the temperature of the cooling water at the inlets of the cooler $29_1$ and $29_2$ (FIG. 3), and an operating condition sensing unit for sensing the operating condition of the internal combustion engine 1.

The operating condition sensing unit for sensing the operating condition of the internal combustion engine 1 includes an engine speed sensor 46 for measuring the engine speed of the internal combustion engine 1, an air-flow sensor 47 for sensing the flow of intake air flowing through the air intake system, a load sensor 48 for determining load on the internal combustion engine 1 from the opening of the throttle valve, an engine temperature sensor 49 for measuring the engine temperature of the internal combustion engine 1, an atmospheric temperature sensor 50 for measuring the temperature of the atmosphere.

The ECU 40 is provided with a storage device storing control programs for controlling the field regulator 15, the clutches 10 and 13, the controller 19 and the fuel injection valves, and maps. The ECU 40 receives signals from the sensors 41 and 50, the CPU of the ECU 40 performs arithmetic operations on the basis of those input signals, and the ECU 40 provides control signals for controlling the field regulator 15, the clutches 10 and 13, the controller 19 and the fuel injection valves.

Figure 4:
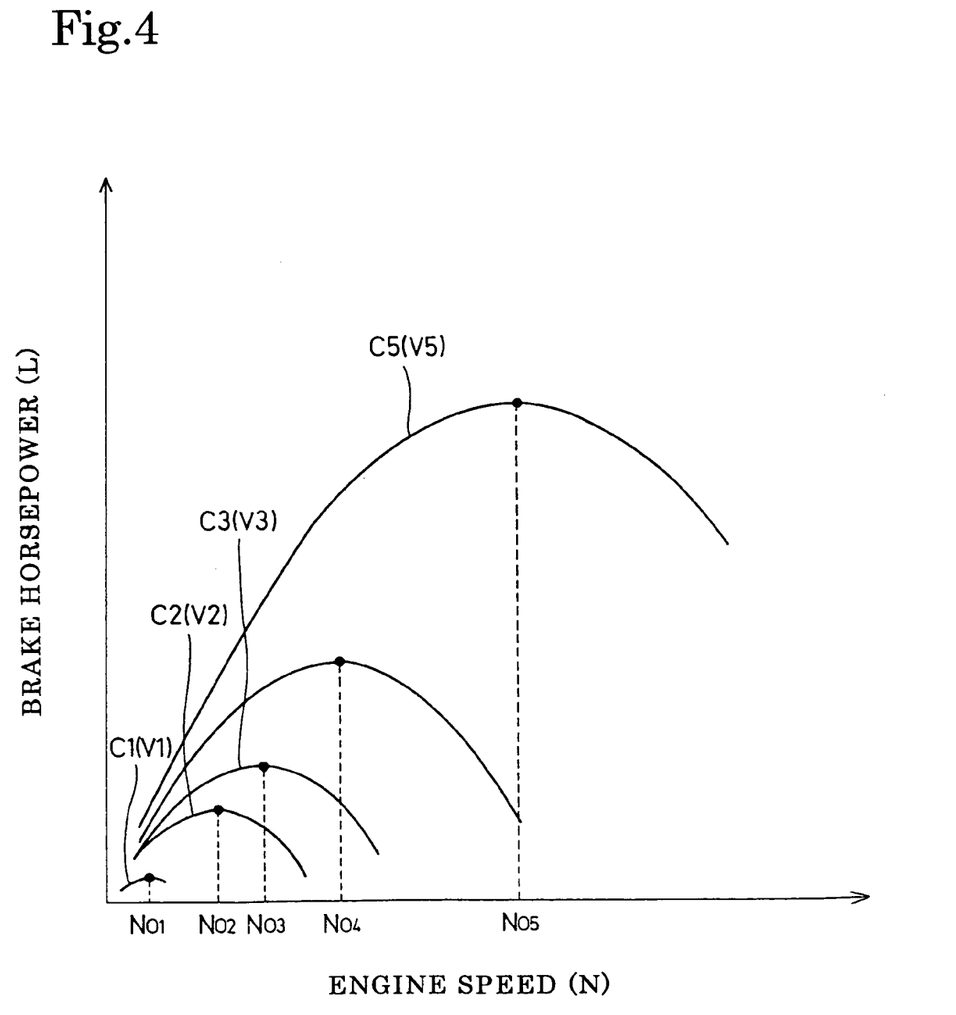
FIG. 4 is a graph showing the brake horsepower characteristic of the Stirling engine shown in FIG. 2.

FIG. 4 shows the brake horsepower characteristic of the Stirling engine 4. In FIG. 4, curves C1 to C5 represent the brake horsepower of the Stirling engine 4 for vehicles speeds V1 to V5, respectively, in a state where the internal combustion engine is operating in a steady state and the vehicle is running at a constant speed. The increasing order of vehicle speeds is V1, V2, V3, V4 and V5.

The load on the internal combustion engine 1 increases with the increase of vehicle speed and, consequently, the inlet temperature of the exhaust gas at the inlet of the heater $27_1$ of the first engine unit $20_1$ rises, the mass flow rate of the exhaust gas at the inlet of the heater $27_1$ increases, and the thermal energy available from the exhaust gas increase. The brake horsepower characteristic curves shown in FIG. 4 are based on an assumption that the temperature of the cooling water supplied to the coolers $29_1$ and $29_2$ is constant for different vehicle speeds.

As the thermal energy of the exhaust gas supplied to the heaters $27_1$ and $27_2$ increases, brake horsepower L at an engine speed N and maximum brake horsepower for each brake horse power characteristic increase, and optimum engine speeds $N_{o1}$ to $N_{o5}$ at which the brake horsepower reaches a maximum increase. After the warming up of the internal combustion engine 1 has been completed, the cooling water heated by the internal combustion engine 1 is cooled while the same flows through the radiator. Therefore, the temperature of the cooling water supplied to the coolers $29_1$ and $29_2$ by the water pump 8 is kept substantially constant.

The ECU 40 of the power unit determines an optimum engine speed, i.e., an optimum engine speed N, at which the Stirling engine 4 generates a maximum or substantially maximum brake horsepower by the following procedure.

The inlet temperature and the mass flow rate of the exhaust gas, namely, quantities of state of the thermal energy of the exhaust gas, at the inlet of the heater $27_1$ of the first engine unit $20_1$ are measured. The inlet temperature is determined by a temperature sensing means for sensing the temperature of the exhaust gas or a temperature calculating means for calculating the temperature of the exhaust gas. The mass flow rate is calculated by a mass flow rate calculating means. The temperature sensing means or the temperature calculating means, and the mass flow rate calculating means constitute a thermal energy calculating means for calculating the thermal energy of the exhaust gas.

The temperature sensing means is the temperature sensor 44. The temperature calculating means includes an operation for retrieving a temperature of the exhaust gas on the basis of an intake air flow rate measured by the air flow sensor 47 and the fuel supply rate calculated by the ECU 40 from a temperature map showing temperatures of the exhaust gas specified by parameters, namely, intake air flow rate, fuel injection rate at which the fuel injection valves jet the fuel, and engine speed at which the internal combustion engine 1 operates, and arithmetic operations of the ECU 40 for correcting the temperature retrieved from the temperature map using an atmospheric temperature measured by the atmospheric temperature sensor 50. The mass flow rate calculating means includes arithmetic operations and processes to be carried out by the ECU 40, for example, for adding the fuel supply rate to an intake air flow rate measured by the air flow rate sensor 47.

The set engine speed corresponding to the measured or calculated inlet temperature and the mass flow rate is retrieved from an engine speed map showing engine speeds specified by parameters, namely, inlet temperature and mass flow rate. The retrieved engine speed is corrected by using factors relating with the maximum brake horsepower of the Stirling engine 4 to determine an optimum engine speed at which the Stirling engine 4 develops a maximum or substantially maximum brake horsepower. If the temperature of the cooling water supplied to the coolers $29_1$ and $29_2$ are used for correcting the set engine speed, a correction coefficient corresponding to the temperature of the cooling water is retrieved from a map of correction coefficients determined by using the temperature of the cooling water as a parameter, and the retrieved correction coefficient is used for correcting the set engine speed.

The ECU 40 controls the field regulator 15 to control load on the generator 3 so as to adjust the engine speed N to the optimum engine speed. The controlled variable of the field regulator 15 may be determined on the basis of a map showing values of the controlled variable and the corresponding optimum engine speeds or may be determined by measuring the engine speed N and performing a feedback control operation to adjust the measured engine speed N to the optimum engine speed.

Thus, the generator 3 is driven by the crankshaft 26 rotating at the optimum engine speed, and the generator 3 generates maximum or substantially maximum generated energy corresponding to the brake horse power characteristic of the Stirling engine 4.

Operation of the ECU 40 for controlling the clutches 10 and 13 on the basis of data measured by the generated energy measuring device 42 will be described with reference to FIG. 1.

When it is decided that the internal combustion engine 1 is operating in the low-load operation range and the generator 3 is unable to generate power sufficient for driving all the auxiliary machines of the auxiliary machine group A, namely, the compressor 6 and the three pumps 7, 8 and 9, the ECU 40 engages the clutches 10 and 13 to drive the auxiliary machine group A in the first drive mode.

When it is decided that the internal combustion engine 1 is operating in a middle-load operation range, the generator 3 is unable to generate power sufficient for driving all the auxiliary machines of the auxiliary machine group A, namely, the compressor 6 and the pumps 7, 8 and 9, and the generator 3 is able to generate power sufficient for driving the three pumps 7, 8 and 9, the ECU 40 disengages the clutch 10 and engages the clutch 13 to drive the auxiliary machine group A in the second drive mode.

When it is decided that the internal combustion engine 1 is operating in a high-load operation range, and the generator 3 is able to generate power sufficient for driving all the auxiliary machines of the auxiliary machine group A, namely, the compressor 6 and the pumps 7, 8 and 9, the ECU 40 disengages the clutches 10 and 13 to drive the auxiliary machine group A in the third drive mode. The clutches 10 and 13 may be engaged to assist the drive of the crankshaft 1a by the electric motor 2.

If the power generated by the generator 3 is insufficient for driving the auxiliary machine group A and it is known that the battery 5 is sufficiently charged from data measured by the voltage sensor 43, power is supplied from the battery 5 to drive the auxiliary machine group A in the second or the third drive mode. If the battery 5 is sufficiently charged, the auxiliary machine group A can be driven by power supplied by the battery 5 in the first drive mode.

When it is known that the voltage of the battery 5 measured by the voltage sensor 43 is a lower limit voltage that requires charging, the ECU 40 drives the electric motor 2 and charges the battery 5 by power generated by the generator 3 if the power is sufficient for driving the electric motor 2 and charging the battery 5. If the power generated by the generator 3 is insufficient for driving the electric motor 2 and charging the battery 5, the ECU 40 gives priority to charging the battery 5 and stops supplying power to the electric motor 2. In such a case, the ECU 40 engages at least either the clutch 10 or the clutch 13 to drive the auxiliary machines by the internal combustion engine 1 instead of by the electric motor 2.

The operation and effect of the power unit will be explained.

In the power unit, the high-temperature heat source for the Stirling engine 4 is the exhaust gas discharged from the internal combustion engine 1, and power generated by the generator 3 is used for driving the electric motor 2 and charging the battery 5. When the exhaust gas has sufficient thermal energy, and the generator 3 driven by the Stirling engine 4 is able to generate power sufficient for driving the compressor 6 and the pumps 7, 8 and 9 or some of those, the electric motor 3 drives the compressor 6 and the pumps 7, 8 and 9, and the internal combustion engine 1 does not need to drive the same. Therefore, the fuel consumption of the internal combustion engine 1, i.e., the prime mover of the vehicle, decreases accordingly, and fuel consumption for running is improved. When the brake horsepower L of the Stirling engine 4 is low due to the small thermal energy of the exhaust gas, and the generator 3 is unable to generate power sufficient for driving the compressor 6 and the pumps 7, 8 and 9, the compressor 6 and the pumps 7, 8 and 9, or some of those can be driven by power supplied by the battery 5 charged by power supplied by the generator 3. Thus, it is possible to ensure that the compressor 6 and the pumps 7, 8 and 9 are driven so that they are able to function satisfactorily even if the brake horsepower L of the Stirling engine 4 is low.

Since the field regulator 15 functions to adjust the engine speed N of the Stirling engine 4 to the optimum engine speed at which the brake horsepower of the Stirling engine 4 increases to a maximum or substantially maximum brake horsepower, the engine speed N of the Stirling engine 4 can be adjusted to the optimum engine speed at which the brake horsepower of the Stirling engine 4 increases to a maximum or substantially maximum brake horsepower even if the brake horsepower characteristic of the Stirling engine 4 varies according to the condition of the thermal energy of the exhaust gas. Consequently, the generator 3 driven by the maximum or substantially maximum brake horsepower is able to generate maximum or substantially maximum power. Thus, a maximum possible part of the thermal energy of the exhaust gas is recovered, and the frequency of driving the compressor 6 and the pumps 7, 8 and 9 by the electric motor 2 driven by the sufficient power increases. Consequently, the fuel consumption of the internal combustion engine 1 can be further reduced, and fuel consumption for running can be further improved.

The auxiliary machine group A is interlocked with the crankshaft 1a of the internal combustion engine 1 by the transmission mechanism T including the clutches 10 and 13, the clutches 10 and 13 are engaged and disengaged so as to drive the compressor 6 and the pumps 7, 8 and 9 selectively by the internal combustion engine 1 or the electric motor 2, and the number of the auxiliary machines to be driven by the electric motor 2 is changed. When the power generated by the generator 3 is insufficient for driving all the four auxiliary machines of the auxiliary machine group A, the number of the auxiliary machines to be driven by the electric motor 2 is changed according to the power generated by the generator 3. When the auxiliary machine group A is driven in the second drive mode, in which the pumps 7, 8 and 9 are driven by the electric motor 2 and the compressor 6 is driven by the internal combustion engine 1, the fuel consumption of the internal combustion engine 1 is reduced and fuel consumption for running is improved. When the exhaust gas has small thermal energy, the brake horsepower of the Stirling engine 4 is low, the generator 3 is unable to generate sufficient power, and the battery 5 is unable to supply sufficient power for driving the auxiliary machines, the auxiliary machine group A cam be surely driven in the first drive mode by the internal combustion engine 1.

The pumps 7, 8 and 9, which are essential auxiliary machines indispensable for the running of the vehicle and the operation of the internal combustion engine 1, can be disconnected from the compressor 6, which is less frequently used than the pumps 7, 8 and 9, by disengaging the clutch 10 to disconnect the compressor 6 from the electric motor 2. Therefore, the frequency of driving the pumps 7, 8 and 9 by the electric motor 2 when the generator 3 is unable to generate sufficient power can be increased. Thus, the increase of the fuel consumption of the internal combustion engine 1 can be suppressed to the utmost and thereby the fuel consumption for running can be improved.

The operating speeds of the pumps 7, 8 and 9, which are highly frequently driven by the electric motor 2, can be properly controlled according to the load on the internal combustion engine 1 regardless of the engine speed of the internal combustion engine 1. thus, the pumps 7, 8 and 9 are able to fully exercise their functions. Since the water pump 8 for supplying the cooling water to the coolers $29_1$ and $29_2$ of the Stirling engine 4 is driven highly frequently by the electric motor 2, the cooling water can be supplied to the coolers $29_1$ and $29_2$ at a flow rate high enough to cool the working gas effectively by driving the water pump 8 by the electric motor 2. Consequently, the brake horsepower L of the Stirling engine 4 can be increased.

Modifications of the foregoing power unit embodying the present invention will be described.

The Stirling engine 4 maybe a single-state Stirling engine having a single engine unit or a multistage Stirling engine having three or more engine units. Although the crankshaft 26 of the Stirling engine 4 is coupled directly with the shaft of the generator 3 to drive the generator 3 in this embodiment, the crankshaft 26 may be connected through an intermediate shaft to the shaft of the generator 3 to drive the generator 3 through the intermediate shaft. Although the generator 3 and its casing are contained in the crankshaft chamber 23 defined by the crankcase 22 in this embodiment, the casing of the generator 3 may be a part of the crankcase; that is, a crankcase of the Stirling engine 4 may have a first crankcase included in the first engine unit $20_1$, a second crankcase included in the second engine unit $20_2$, and the casing of the generator 3 interposed between and joined to the first and the second crankcase.

Although the crankshaft 1a is the drive shaft for driving the auxiliary machine group A in this embodiment, the crankshaft 1a may drive the auxiliary machine group A through a drive shaft. The auxiliary machine group A may include a single auxiliary machine or four or more auxiliary machines.

Although the exhaust gas flows from the heater $27_1$ of the first engine unit $20_1$ into the heater $27_2$ of the second engine unit $20_2$ in this embodiment, the exhaust gas may be supplied through the supply pipe 32 directly into the heaters $27_1$ and $27_2$. When the exhaust gas is supplied through the supply pipe 32 directly into the heaters $27_1$ and $27_2$, inlet temperatures and mass flow rates of the exhaust gas are measured at the respective inlets of the heaters $27_1$ and $27_2$.

Although the invention has been described on an assumption that the internal combustion engine 1 is an automotive engine, the internal combustion engine maybe a marine propulsion machine, such as an outboard engine provided with a vertical crankshaft. The internal combustion engine 1 may be an internal combustion engine other than a reciprocating internal combustion engine, such as a gas turbine. The combustion engine may be an external combustion engine.

The invention of claimed is:

1. A power unit comprising: a combustion engine as a prime mover for driving devices; auxiliary machinery for the combustion engine; an electric motor; a generator; and a Stirling engine operated by a working gas to drive the generator;

wherein the Stirling engine has a heater that uses waste heat produced by the combustion engine for heating the working gas, a battery is connected to the electric motor to supply power to the electric motor, the generator is connected to the electric motor and the battery to supply generated power to the electric motor and the battery, and the electric motor is connected to the auxiliary machinery to drive the auxiliary machinery, and wherein the auxiliary machinery is an auxiliary machine group including a plurality of auxiliary machines, the auxiliary machines of the auxiliary machine group are connected through a transmission mechanism including clutches to the combustion engine, the clutches are engaged and disengaged to drive the plurality of auxiliary machines selectively by the combustion engine or the electric motor, and a control system determines selectively, the number of the auxiliary machines to be driven by the electric motor.

2. The power unit according to claim 1 further comprising an engine speed control means for adjusting the engine speed of the Stirling engine to an optimum engine speed at which the Stirling engine produces a maximum or substantially maximum brake horsepower.

3. The power unit according to claim 1, wherein the combustion engine is interlocked with a first one of the auxiliary machines by a first clutch, the auxiliary machine interlocked with the combustion engine is interlocked with the electric motor by a second clutch, the electric motor is operatively connected to the rest of the auxiliary machines, and the first and the second clutch are controlled by a control system so as to be engaged or disengaged according to the operating condition of the power unit.

4. The power unit according to claim 3, wherein the control system is operative to engage both the first and the second clutch to connect the combustion engine operatively to all the auxiliary machines when the combustion engine is operating in a low-load operation range and sufficient power cannot be supplied to the electric motor.

5. The power unit according to claim 3, wherein the control system is operative to engage the first clutch and to disengage the second clutch so as to connect the auxiliary machines excluding the first auxiliary machine to the electric motor when the power for driving only the auxiliary machines excluding the first auxiliary machine is supplied to the electric motor while the combustion engine is operating in a middle-load operation range, whereby the auxiliary machines excluding the first auxiliary machine are driven by the electric motor.

6. The power unit according to claim 3, wherein the control system is operative to disengage the first clutch and engage the second clutch to connect all the auxiliary machines to the electric motor when power sufficient for driving all the auxiliary machines is supplied to the electric motor while the combustion engine is operating in a high-load operation range.

7. A power unit comprising:
a combustion engine as a prime mover;
a first auxiliary machine for the combustion engine;
at least one second auxiliary machine for the combustion engine;
a first clutch interposed between said combustion engine and said first auxiliary machine for engagement and disengagement therebetween;
an electric motor connected to at least one second auxiliary machine to drive the same;
a second clutch interposed between said first auxiliary machine and said electric motor for engagement and disengagement therebetween;
a battery connected to the electric motor to supply power to the electric motor;
a generator connected to the electric motor and the battery to supply generated power to the electric motor and the battery;
a Stirling engine for driving the generator, said Stirling engine having a heater using waste heat produced by the combustion engine to heat a working gas in the Stirling engine; and
a control system for controlling said first and second clutches for engagement and disengagement thereof in such a manner that:
both said first and second clutches are engaged to connect the combustion engine to both the first and second auxiliary machines to drive both the first and second auxiliary machines by the combustion engine, when the combustion engine is operating in a low-load operation range and sufficient power is not supplied to the electric motor;
said first clutch remains engaged to drive the first auxiliary machine by the combustion engine and said second clutch is disengaged to drive the second auxiliary machine by only the electric motor, when the combustion engine is operating in a middle-load operation range and power for driving only the second auxiliary machine is supplied to the electric motor; and
said first clutch is disengaged and said second clutch is engaged to drive both said first and second auxiliary machines by the electric motor when the combustion engine is operating in a high-load operation range and power sufficient for driving both the first and second auxiliary machines is supplied to the electric motor.

8. The power unit according to claim 7, wherein said first auxiliary machine is compressor.

9. The power unit according to claim 7, wherein said second auxiliary machine is a pump.

* * * * *